United States Patent
Veshchikov et al.

(10) Patent No.: US 11,586,983 B2
(45) Date of Patent: Feb. 21, 2023

(54) DATA PROCESSING SYSTEM AND METHOD FOR ACQUIRING DATA FOR TRAINING A MACHINE LEARNING MODEL FOR USE IN MONITORING THE DATA PROCESSING SYSTEM FOR ANOMALIES

(71) Applicant: NXP B.V., Eindhoven (NL)

(72) Inventors: Nikita Veshchikov, Brussels (BE); Rudi Verslegers, Genk (BE)

(73) Assignee: NXP B.V., Eindhoven (NL)

( * ) Notice: Subject to any disclaimer, the term of this patent is extended or adjusted under 35 U.S.C. 154(b) by 443 days.

(21) Appl. No.: 16/805,953

(22) Filed: Mar. 2, 2020

(65) Prior Publication Data

US 2021/0272016 A1  Sep. 2, 2021

(51) Int. Cl.
*G06F 11/00* (2006.01)
*G06N 20/00* (2019.01)
*G06F 11/07* (2006.01)
*G06F 11/34* (2006.01)
*G06F 11/22* (2006.01)

(52) U.S. Cl.
CPC ......... *G06N 20/00* (2019.01); *G06F 11/0709* (2013.01); *G06F 11/2263* (2013.01); *G06F 11/3476* (2013.01)

(58) Field of Classification Search
CPC .................. G06F 11/2263; G06F 11/3476
USPC ...................................... 714/1–57
See application file for complete search history.

(56) References Cited

U.S. PATENT DOCUMENTS

| | | | |
|---|---|---|---|
| 9,973,392 B2 | 5/2018 | Jain et al. | |
| 2009/0228412 A1 | 9/2009 | Matsumoto et al. | |
| 2014/0019795 A1* | 1/2014 | Sonoda | G06F 11/0715 714/37 |
| 2015/0110387 A1* | 4/2015 | Lienhart | G06F 16/5838 382/159 |
| 2015/0121136 A1* | 4/2015 | Namkoong | G06F 11/0793 714/15 |
| 2015/0212817 A1* | 7/2015 | Raikin | G06F 11/0745 714/38.14 |

(Continued)

OTHER PUBLICATIONS

Lane, Terran; "Machine Learning Techniques for the Domain of Anomaly Detection for Computer Security;" Publication Date Jul. 16, 1998; Purdue University, Indiana, USA Journal.

(Continued)

*Primary Examiner* — Sarai E Butler
(74) *Attorney, Agent, or Firm* — Daniel D. Hill

(57) ABSTRACT

A data processing system and a method are provided for acquiring data for training a machine learning (ML) model for use in self-monitoring the data processing system. The data processing system operates in a data acquisition mode to acquire training data for training the ML model. The training data is acquired from an anomaly detector of the data processing system while operating in the data acquisition mode. At least a portion of the training data is determined to be biased, and a portion of the training data is unbiased. The unbiased portion of the training data is transferred to a training environment external to the data processing system. The unbiased portion of the training data is acquired for training the ML model to function with the anomaly detector during a normal operating mode to determine when an anomaly is present in the data processing system.

19 Claims, 7 Drawing Sheets

DATA ACQUISITION MODE

NORMAL OPERATING MODE

(56) References Cited

U.S. PATENT DOCUMENTS

| | | | |
|---|---|---|---|
| 2016/0147589 A1* | 5/2016 | Noel | G06F 11/0751 |
| | | | 714/57 |
| 2017/0185902 A1* | 6/2017 | Kumar | G06Q 10/04 |
| 2018/0096261 A1* | 4/2018 | Chu | G06N 20/20 |
| 2018/0354125 A1 | 12/2018 | Ueda | |
| 2019/0041484 A1 | 2/2019 | Mishra et al. | |
| 2019/0087744 A1 | 3/2019 | Schiemenz | |
| 2019/0133506 A1 | 5/2019 | Ringemann | |
| 2019/0147364 A1 | 5/2019 | Alt et al. | |
| 2019/0199599 A1* | 6/2019 | Zavesky | H04L 41/0672 |
| 2019/0228312 A1* | 7/2019 | Andoni | G06N 3/084 |
| 2019/0258927 A1* | 8/2019 | Chen | G06N 3/08 |
| 2019/0287208 A1* | 9/2019 | Yerli | G06T 1/20 |
| 2019/0325344 A1* | 10/2019 | Chen | G06N 20/00 |
| 2020/0272945 A1* | 8/2020 | Manamohan | G06N 20/10 |
| 2021/0182699 A1* | 6/2021 | Koyyalummal | G06N 5/04 |

OTHER PUBLICATIONS

Zhou, Yu-Yang; "An Efficient Network Intrusion Detection System Based on Feature Selection and Ensemble Classifier;" arXiv.org > cs > arXiv:1904.01352; Submitted Apr. 2, 2019; Last Revised Sep. 19, 2019.

* cited by examiner

DATA PROCESSING SYSTEM AND METHOD FOR ACQUIRING DATA FOR TRAINING A MACHINE LEARNING MODEL FOR USE IN MONITORING THE DATA PROCESSING SYSTEM FOR ANOMALIES

BACKGROUND

Field

This disclosure relates generally to machine learning, and more particularly, to a data processing system and method for acquiring data for training a machine learning (ML) model for use in monitoring the data processing system for anomalies.

Related Art

Machine learning is becoming more widely used in many of today's applications. For example, a machine learning (ML) model can be used to make predictions about different types of phenomena, classify images, detect objects in video streams, and to predict the weather. One application for an ML model is to monitor a system state of a data processing system. The ML model can help to detect anomalies in both hardware and software of the data processing system.

Creation of a ML model is accomplished by training the ML model, at least partly, before it is used. A training dataset is used for training the ML model. In some applications, a large amount of training data may be needed to create a good ML model. The training data should come from the same statistical distribution as the data that the ML model will use during inference operation. For example, if the ML model is trained for classifying images, then the images used for training should be the same size and format as the images that are provided to the ML model during inference operation.

Also, the training dataset should not be biased, and should be representative of the real data the ML model will analyze during inference operation. For example, a ML model intended for predicting something about a particular age group of people should be trained with training data from the appropriate age group. In the case of a ML model used for self-monitoring a system to detect anomalies in the system, the ML model should be trained with training data produced from the system to be monitored. However, acquiring the training data for training the ML model may influence, and bias, the operation of the system such that the ML model may not be trained by a completely unbiased system. That is, a training dataset of self-measurements may be biased so that the ML model is not trained with training data that accurately reflects the true operational states of the system to be monitored.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
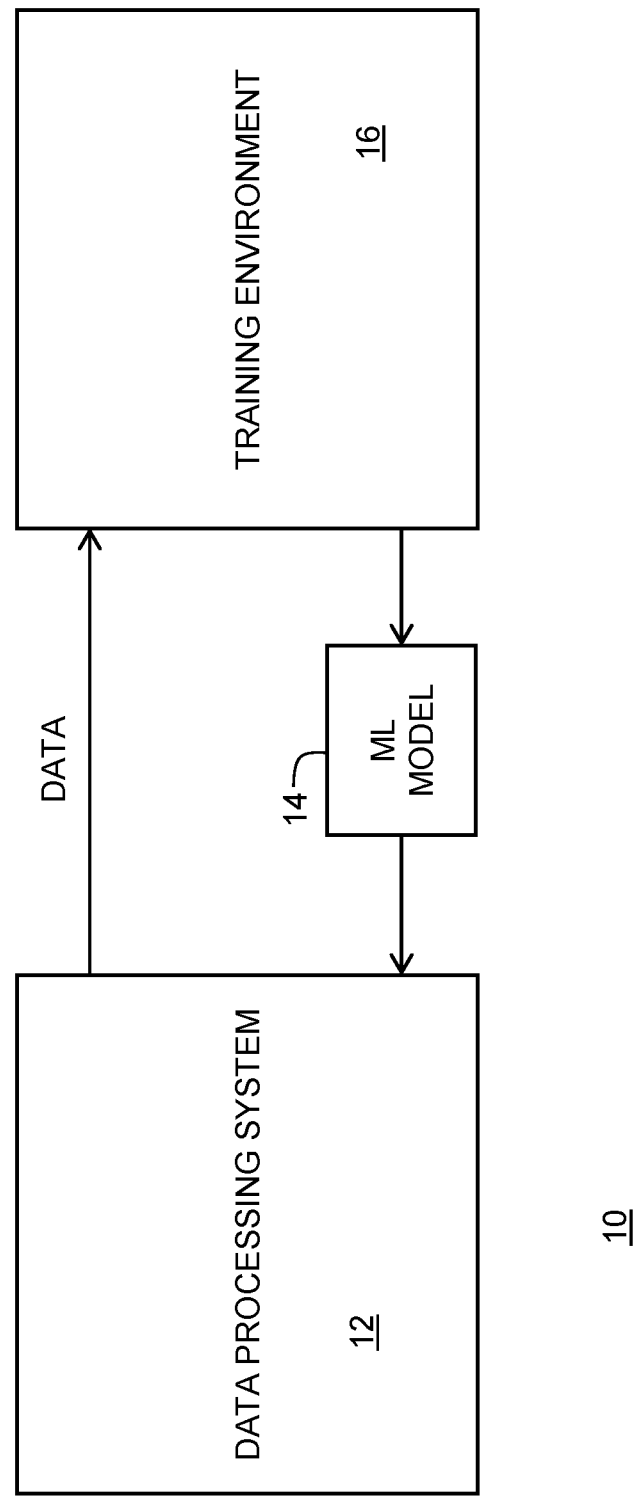
FIG. 1 illustrates a system for training a ML model for self-monitoring a data processing system in accordance with an embodiment.

Generally, there is provided, a method and data processing system for acquiring data for training a ML model for use in a self-monitoring operation of the data processing system. In one embodiment, the data processing system includes an anomaly detector for monitoring an internal state of the data processing system. The ML model, when trained, will be used with the anomaly detector for detecting anomalies in the data processing system. To build a sufficiently large training dataset, data is acquired from the anomaly detector when the data processing system is operating, and the training data is provided to the training environment. However, outputting the detector data to the training environment using the normal input/output (I/O) functionality of the system may create extra traffic that disturbs the normal state of the data processing system and potentially biases the acquired training data. One way to lessen this disturbance is to provide a dedicated hardware interface between the anomaly detector and the training environment that will use the training data. However, the dedicated hardware interface can be expensive to implement and use because it is not needed in the system after the training data is acquired and the ML model is trained.

The data processing system, in accordance with an embodiment, includes a memory for storing the ML model and code for running a detector application during normal operation of the data processing system. Once trained, the trained ML model and related applications are stored on the data processing system to provide self-monitoring for the data processing system. Because initially there is not yet a trained ML model, the ML model memory is not used for storing an ML model. Therefore, the acquired training data may be temporarily stored in the ML model memory before being output to a ML training environment. Then, when the normal I/O functionality of the data processing system is not being used for normal processing, it can be used to transfer acquired training data to the training environment, thus reducing the chance of network congestion and any bias to the data any network congestion may cause.

Also, in accordance with another embodiment, to ensure that unbiased training data is acquired, a dummy function is provided that reports a predetermined status of the device, for example, the dummy function may always report a fake OK status. The dummy function reports the status is OK because that is what the ML model would report under similar normal conditions. The dummy OK function can be stored in the ML model memory during data acquisition, and then deleted after the ML model is trained because the dummy OK function will no longer be needed. At the end of each acquisition period, or when the memory is full, a normal communication channel can be used to send the data from the device to a memory in the training environment. In another embodiment, if abnormal data was desired to be acquired under abnormal conditions, then another dummy function could be created to report an anomaly in the device, or the data is "not OK."

If there is a disturbance during a training data transfer to the training environment, it may not be known how long the disturbance will remain before unbiased data can be collected again. Also, data acquired during a subsequent acquisition can be biased by the previous acquisition. One way to solve this problem is to just wait a long period of time after the disturbance before resuming data acquisition. Another way is to restart the device after every single data transfer so that each data transfer is a first transfer from the point of view of the device. This ensures unbiased data is used to train the ML model so the ML model will detect an anomaly more accurately.

In accordance with an embodiment, there is provided, a method for acquiring data for training a machine learning (ML) model for use in self-monitoring a data processing system, the method including: operating the data processing system in a data acquisition mode to acquire training data for training the ML model; acquiring the training data from an anomaly detector of the data processing system while operating in the data acquisition mode; determining that at least a portion of the training data is biased, and a portion of the training data is unbiased; and transferring the unbiased portion of the training data to a training environment external to the data processing system, wherein the unbiased portion of the training data is acquired for training the ML model to function with the anomaly detector during a normal operating mode to determine when an anomaly is present in the data processing system. Providing the data to a training environment may further include using a dedicated interface to provide the data to the training environment. Acquiring the data from the anomaly detector may further include: providing a dummy function in the data processing system, the dummy function configured to always indicate to the data processing system that operation of the data processing system is a predetermined state when the training data is being acquired; storing the training data in a memory of the data processing system during a data acquisition period; and transferring the data to the training environment during a data transfer period following the data acquisition period. The data may be transferred using a general-purpose input/output (I/O) port of the data processing system. Storing the training data in a memory of the data processing system during a data acquisition period may further include storing the training data in a memory used to store at least a portion of the ML model during the normal operating mode. If a portion of the data transfer period overlaps with a portion of the data acquisition period, the training data acquired during a time when the data transfer period overlaps with the data acquisition period may be discarded. Determining that at least a portion of the training data is biased may further include determining that the biased portion of the training data is biased when the training data is provided to the training environment concurrently with the acquisition of the training data from the anomaly detector. The unbiased training data may only be acquired a predetermined amount of time after transferring the unbiased portion of the training data to the training environment is complete. The method may further include: determining that an initial data acquisition after powering up the data processing system is not biased; and determining that subsequent data acquisitions have a beginning portion that is biased, wherein the beginning portion of the subsequent data acquisition is discarded.

In another embodiment, there is provided, a data processing system including: a processor for executing instructions; a machine learning (ML) model; an anomaly detector, the anomaly detector used for acquiring training data for training the ML model during a training data acquisition mode of the data processing system, wherein the anomaly detector and the ML model together determine when an anomaly is present in the data processing system during a normal operating mode; a memory, coupled to the processor and to the anomaly detector, wherein the acquired training data is stored in the memory before being transferred to an ML model training environment; and a data transfer interface for transferring the acquired training data to the training environment during a time when the training data is not being acquired using the anomaly detector. Training data acquired during a period of time after a data transfer period may be determined to be biased and may be discarded. The data transfer interface may be characterized as being a general-purpose input/output port. The memory may be used for storing at least a portion of the ML model after the ML model is trained and being used for anomaly detection during the normal operating mode. The data processing system may further include a dummy function stored in the memory, the dummy function configured to always indicate to the data processing system that the operation of the data processing system is normal when the training data is being acquired. The data processing system may be implemented using one or more integrated circuits. The data processing system may, further include determining that an initial data acquisition after powering up the data processing system is not biased.

In yet another embodiment, there is provided, a method for acquiring data for training a machine learning (ML) model for use in self-monitoring a data processing system, the method including: operating the data processing system in a data acquisition mode to acquire training data for training the ML model; acquiring the training data from an anomaly detector of the data processing system while operating in the data acquisition mode; providing a dummy function in the data processing system, the dummy function configured to always indicate to the data processing system that operation of the data processing system is normal when the training data is being acquired; storing the training data in a memory of the data processing system during a data acquisition period; transferring the data to the training environment during a data transfer period following the data acquisition period; determining that at least a portion of the training data is biased, and a portion of the training data is unbiased; and transferring the unbiased portion of the training data to a training environment external to the data processing system, wherein the unbiased portion of the training data is acquired for training the ML model to function with the anomaly detector during a normal operating mode to determine when an anomaly is present in the data processing system. Determining that at least a portion of the training data is biased, and a portion of the training data is unbiased, may further include determining that a portion of the training data acquired during a data acquisition period that immediately follows a data transfer period is biased and is discarded. Transferring the data to the training environment during a data transfer period following the data acquisition period may further include transferring the data using a general-purpose input/output (I/O) port of the data processing system. The anomaly detector may be for detecting an unauthorized access to the data processing system.

FIG. 1 illustrates simplified system 10 for training a ML model 14 for self-monitoring data processing system 12 in accordance with an embodiment. Data processing system 12 may be implemented on one or more integrated circuits. Training ML model 14 requires training data from the monitored system under the same operating parameters as are present during normal operation of data processing system 12. As training data (labeled DATA in FIG. 1) is acquired, the training data is provided to training environment 16 where ML model 14 will be trained. Generally, a training environment may use an external server for training. Once trained, ML model 14 is loaded into data processing system 12.

Acquiring training data DATA from data processing system 12 may require actions from data processing system 12 that are not usually performed during normal monitoring of data processing system 12. These actions may disturb the normal state of the system in several ways that are visible to a processor or application of data processing system 12. For example, if an application uses networking capabilities of data processing system 12 and the training data acquisition mechanism also uses the networking capabilities, then extra data communications traffic is created that might interfere with the normal data communications and therefore cause the training data to have a bias that affects training of ML model 14. Also, in another example, a memory used to store the training data may experience a similar congestion if the training data is stored on data processing system 12 during training data acquisition. A driver that controls reading and writing operations on data processing system 12 would have more reading and writing operations and therefore more time would be required for normal data communications thus potentially biasing the training data. Also, more reading and writing operations may affect data processing system 12 in other ways, such as higher current and more heat being generated that can potentially bias the training data.

Figure 2:
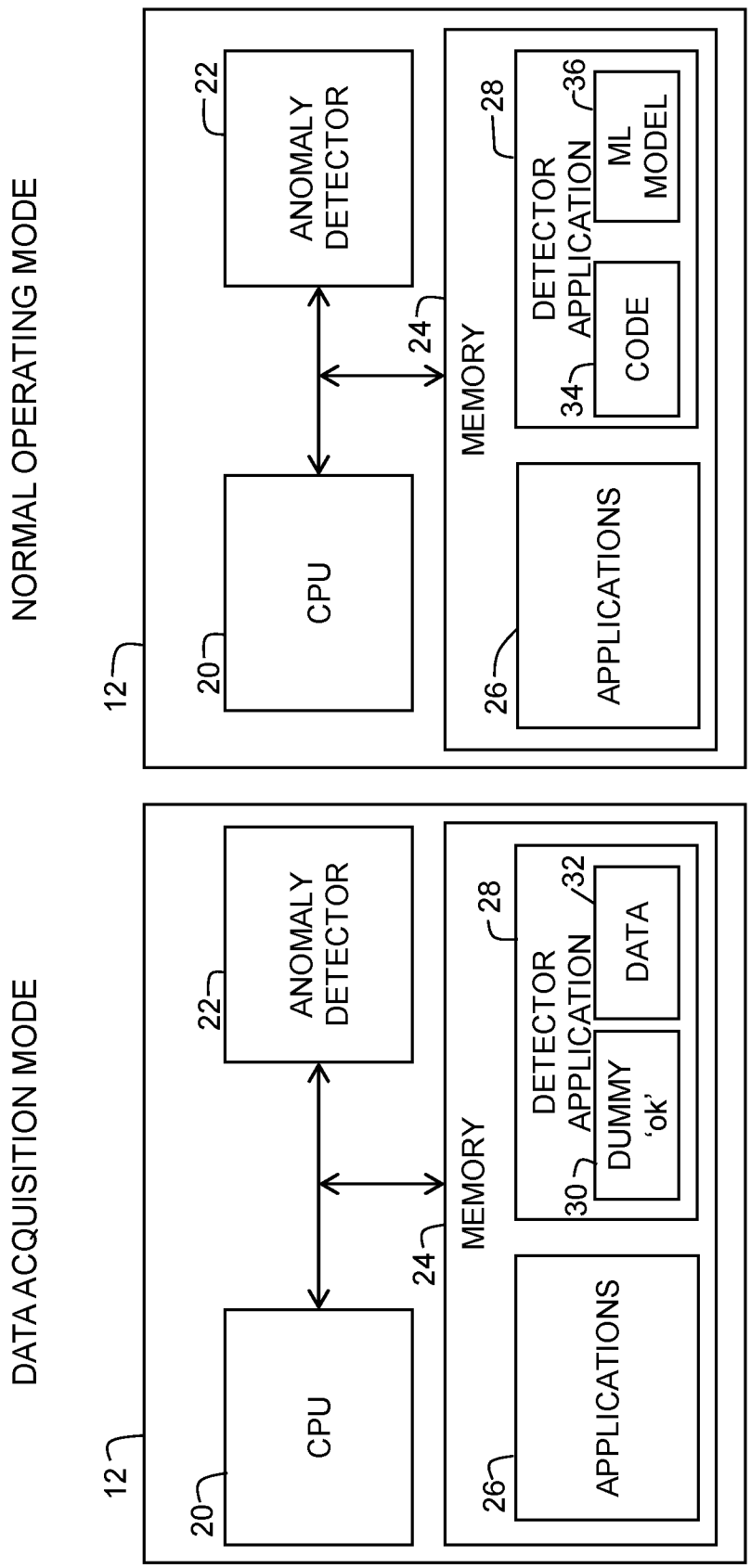
FIG. 2 illustrates memory allocation in a data processing system during training data acquisition and during normal operation.

FIG. 2 illustrates memory allocation in data processing system 12 during a training data acquisition mode and during a normal operating mode. Data processing system 12 includes a central processing unit (CPU) 20, an anomaly detector 22, and memory 24. During the normal operating mode illustrated on the right side of FIG. 2, anomaly detector 22 with ML model 36 and code 34 monitors the activities of CPU 20, and memory 24 to detect unusual behavior in data processing system 12. There are various types of anomalies that can be monitored by anomaly detector 22. For example, anomaly detector 22 may monitor temperature, voltage, pressure, and various hardware event counters of CPU 20. One example of a hardware event counter is that used in the performance monitoring unit (PMU) of an ARM based processor. Also, the anomaly detector may be for detecting an unauthorized access to the data processing system, or an attempt to extract ML model 36.

ML model 36 must be trained before it can be used for anomaly detection. Training data is acquired from data processing system 12 during operation in a data acquisition mode. To acquire the best training data without biases as discussed above, the training data should be acquired while data processing system 12 is operating as realistically as possible. In accordance with an embodiment, memory 24 is used differently during the data acquisition mode than during the normal operating mode. As can be seen in both sides of FIG. 2, memory 24 is partitioned between storing applications 26 and anomaly detection applications 28. During a normal operating mode, as illustrated on the right side of FIG. 2, anomaly detector applications 28 stores detector code 34 and at least a portion of ML model 36. Before a trained ML model is available, the memory portion reserved for ML model 36 is not yet used because the trained ML model is not available. Likewise, the memory portion reserved for detector code 34 is not used. Therefore, these two portions of memory 24 can be used during the data acquisition mode as illustrated on the left side of FIG. 2. As illustrated on the left side of FIG. 2, A dummy OK function 30 and acquired training data 32 are stored in detector applications memory portion 28 during operation in data acquisition mode. While data processing system 12 is operating in data acquisition mode, dummy ok function 30 provides a fake ok status. Dummy ok function always reports that the state of data processing system 12 is ok since this is what the ML model 36 would report in normal conditions. Alternatively, dummy ok function 30 may be substituted with a dummy "not ok" function that would always report an anomaly in data processing system 12 if it is desired to acquire data in abnormal conditions instead of normal conditions. After the memory portions are full, or data acquisition is finished, the data can be transferred to the training environment external to data processing system 12.

Figure 3:
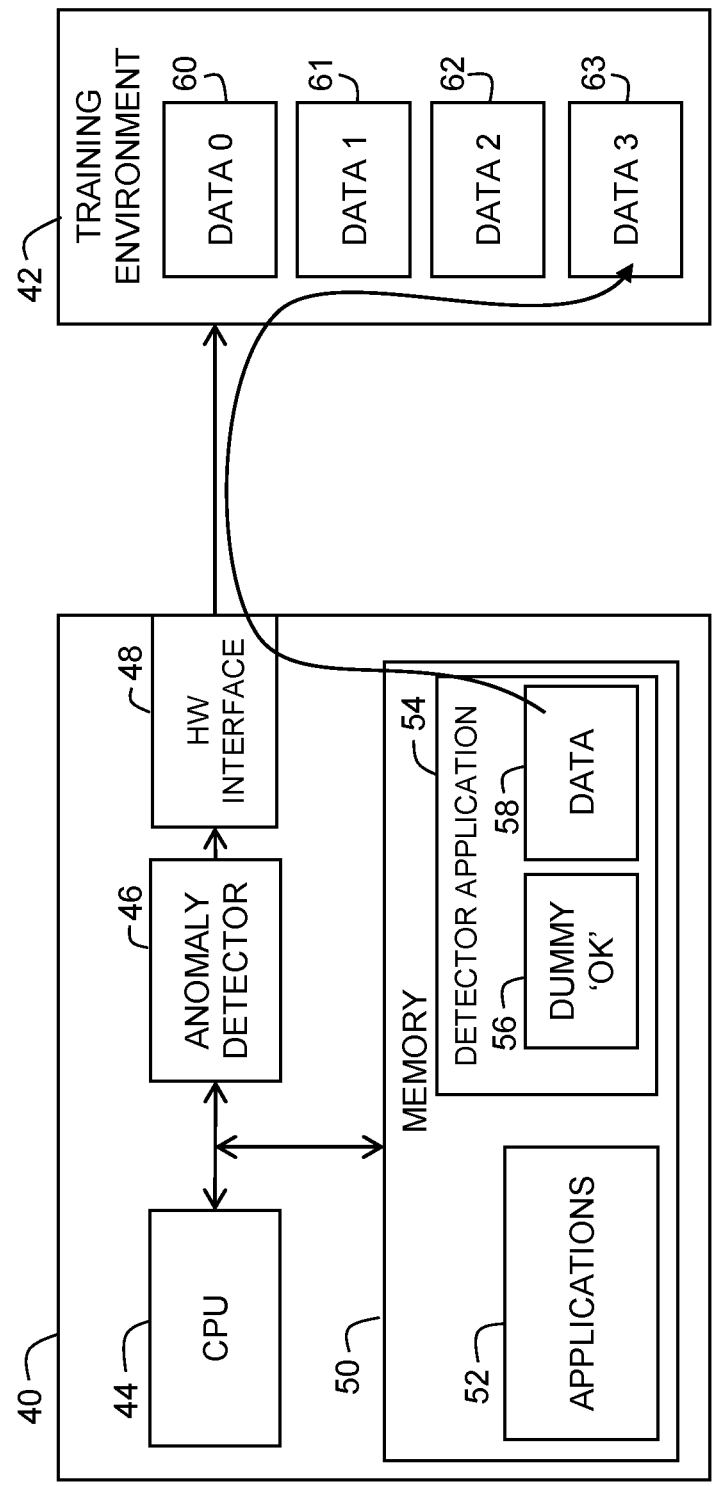
FIG. 3 illustrates data transfer to the ML training environment from the data processing system in accordance with an embodiment.

FIG. 3 illustrates data transfer to the ML training environment from data processing system 40 during a data acquisition mode in accordance with an embodiment. Data processing system 40 includes CPU 44, anomaly detector 46, hardware (HW) interface 48, and memory 50. Memory 50 includes applications portion 52 and detector application portion 54. Detector application portion 54 is divided into dummy OK portion 56 and data portion 58. When training data has been acquired and the memory portions of memory 58 shown in FIG. 3 are full with training data, the training data can be transferred to the training environment. The data can be transferred using any available interface. For example, in FIG. 3, data is transferred from memory portion 58 to training environment 42 via HW interface 48. As can be seen, the data is transferred in portions, or blocks, 60-63 so that training data is not transferred at the same time as other data communications that may be required by, for example, CPU 44. Also, training data is not transferred while data acquisition is in progress to avoid disturbing the training data. If data is transferred at the same time data is acquired, then the acquired data may be biased. Data acquisition should be stopped before data is transferred to training environment 42. After a data transfer is finished, the data acquisition can be restarted.

Figure 4:
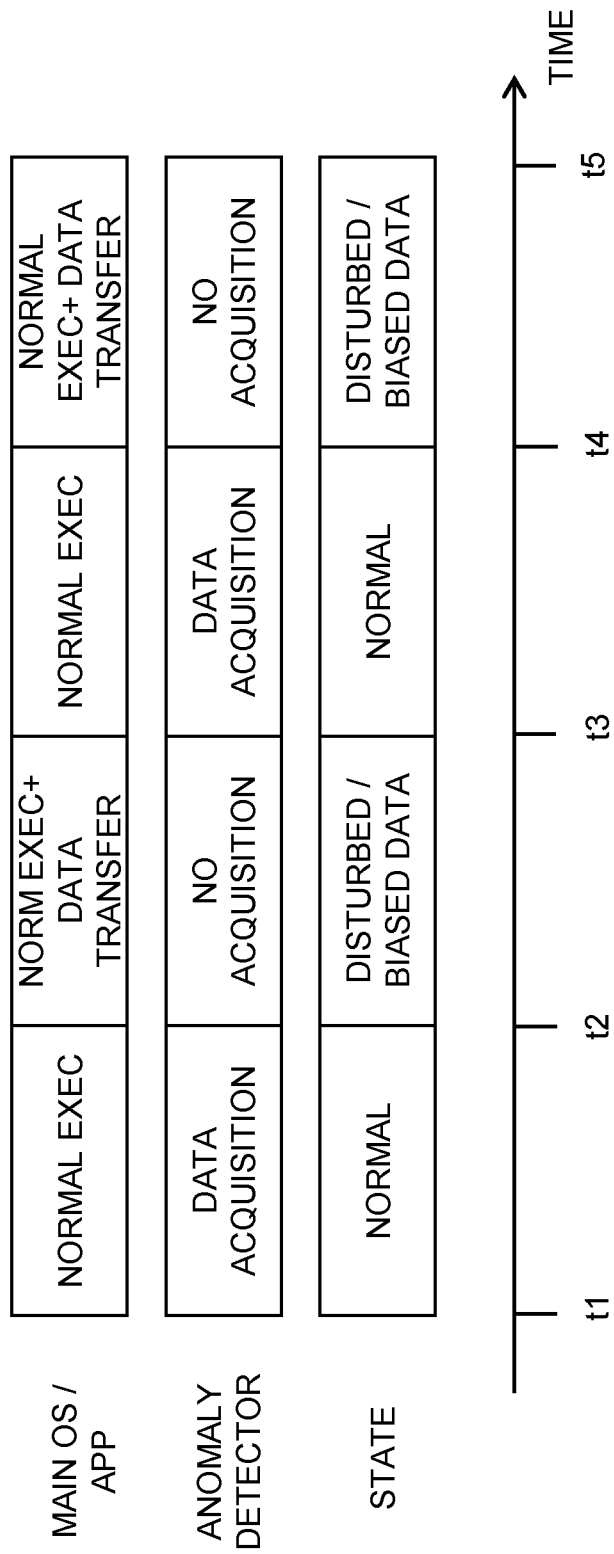
FIG. 4 illustrates a timing diagram for data acquisition and data transfer of the data processing system in accordance with an embodiment.

FIG. 4 illustrates a timing diagram for data acquisition and data transfer from anomaly detector from the point of view of the operating system (OS) in the data processing system in accordance with an embodiment. Between times t1 and t2, the main OS is executing instructions normally while the anomaly detector is monitoring the main OS and acquiring data. The state of the data acquisition is normal. Between times t2 and t3, the main OS is operating, and a data transfer is occurring to transfer data to the training environment. The data may be disturbed/biased because the data transfer to the training environment will not be a normal activity after the ML model is trained. From times t3 to t4, the main OS execution is normal with no data transfer indicated, data acquisition from the anomaly detector is normal, and the state of the acquired data is normal with no bias. From times t4 to t5, a data transfer is occurring, so any data acquisition during this time would be disturbed/biased.

Figure 5:
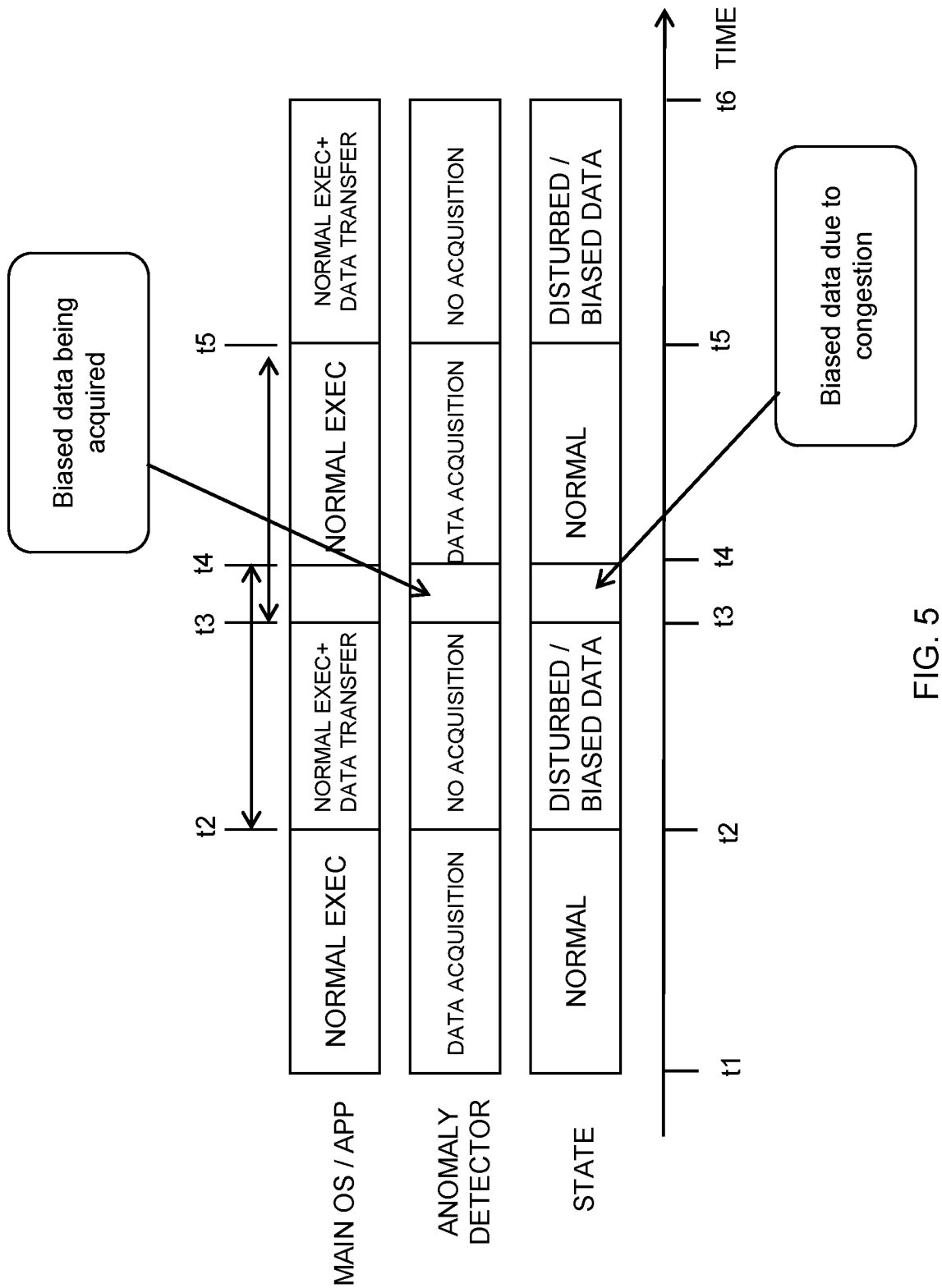
FIG. 5 illustrates a timing diagram for overlapping data acquisition and data transfer from anomaly detector from the point of view of the operating system (OS).

FIG. 5 illustrates a timing diagram for overlapping data acquisition and data transfer from an anomaly detector from the point of view of the operating system (OS). Between times t1 and t2, main OS operation is normal, data is being acquired by the anomaly detector, and the state of the data acquisition is normal. Between times t2 and t4, a data transfer is occurring. No data is being acquired between times t2 and t3, but a data acquisition period begins at time t3, before the data transfer period is ended, causing disturbed data acquisition between times t3 and t4 as indicated by the balloons in FIG. 5. The data acquisition after time t4 is not disturbed/biased because the data transfer ended at time t4. At time t5, another data transfer begins, but there is no congestion on the network that may cause an overlap between data acquisition and data transfer. No disturbed/ biased data is acquired because the anomaly detector was not acquiring data between times t5 and t6.

One solution to the problem of acquiring disturbed/biased data is to restart the device after every data transfer so that there is no data transfer period and no disturbance from the data transfer prior to the data acquisition period. This approach can result in acquiring only unbiased data, however, the data acquisition can be time consuming.

Figure 6:
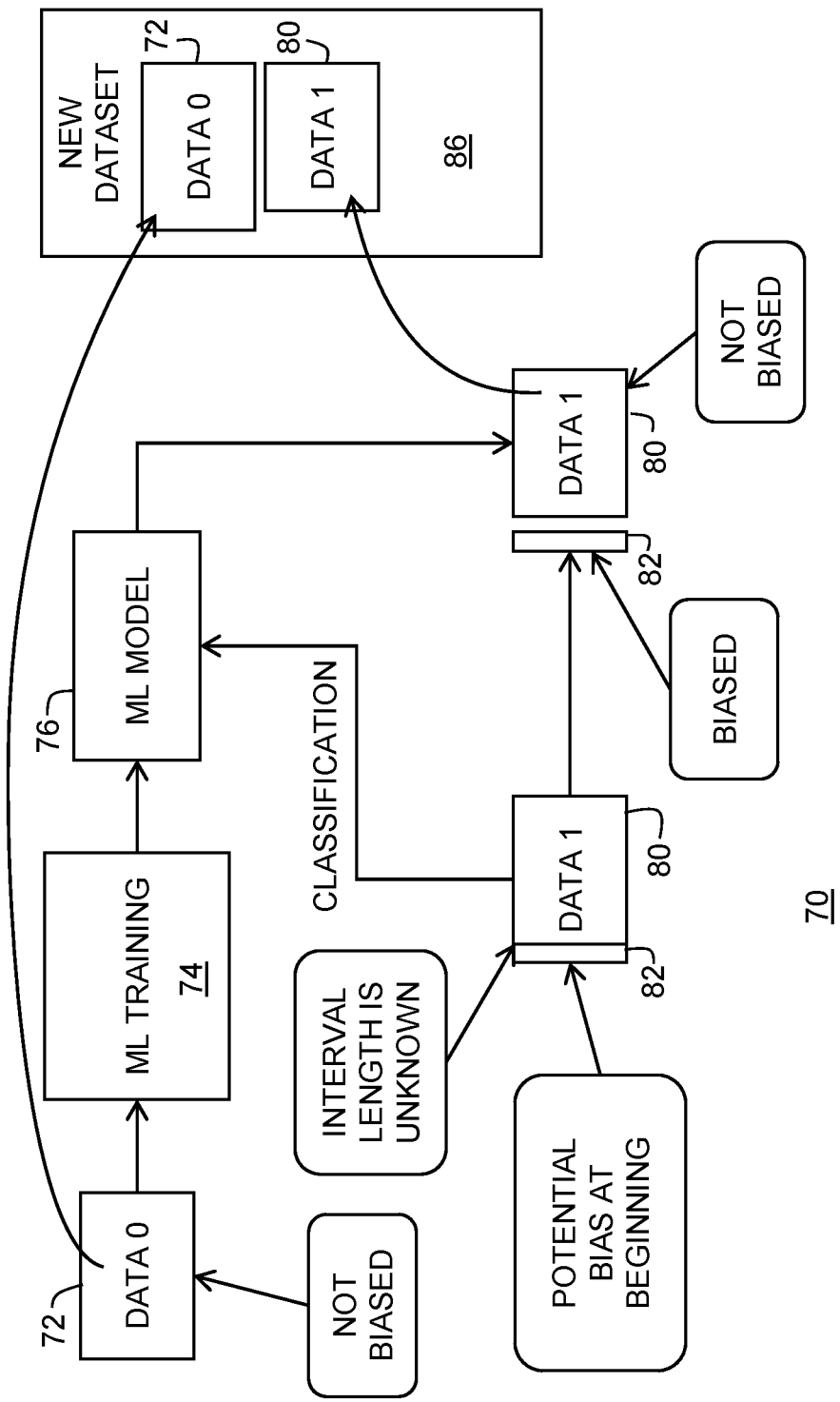
FIG. 6 illustrates a method for acquiring unbiased training data for a ML model in accordance with an embodiment.

FIG. 6 illustrates a method for acquiring unbiased training data for a ML model in accordance with an embodiment. The method does not require the data processing system to be restarted after every data transfer to acquire unbiased data. Data 72, an initial data acquisition (DATA 0) occurs before any data transfers occur so that DATA 0 is not disturbed or biased. DATA 0 is provided to an ML training environment algorithm 74. ML algorithm 74 is used to detect disturbed data. ML model 76 is constructed based on the first acquisition and a statistical algorithm. ML model 76 is used to classify the next block of data 80 to determine at which point the biased portion 82 is no longer biased. If the data is determined to be undisturbed, then the data becomes part of the new training dataset 86. The length of the potentially biased portion 82 is initially unknown. ML model 76 determines the length of biased portion 82 and causes biased portion 82 to be discarded. Balloons are used in FIG. 6 to illustrate the status of the acquired training data for the above described situations. The unbiased remainder 80 (DATA 1) is saved as part of new dataset 86.

Figure 7:
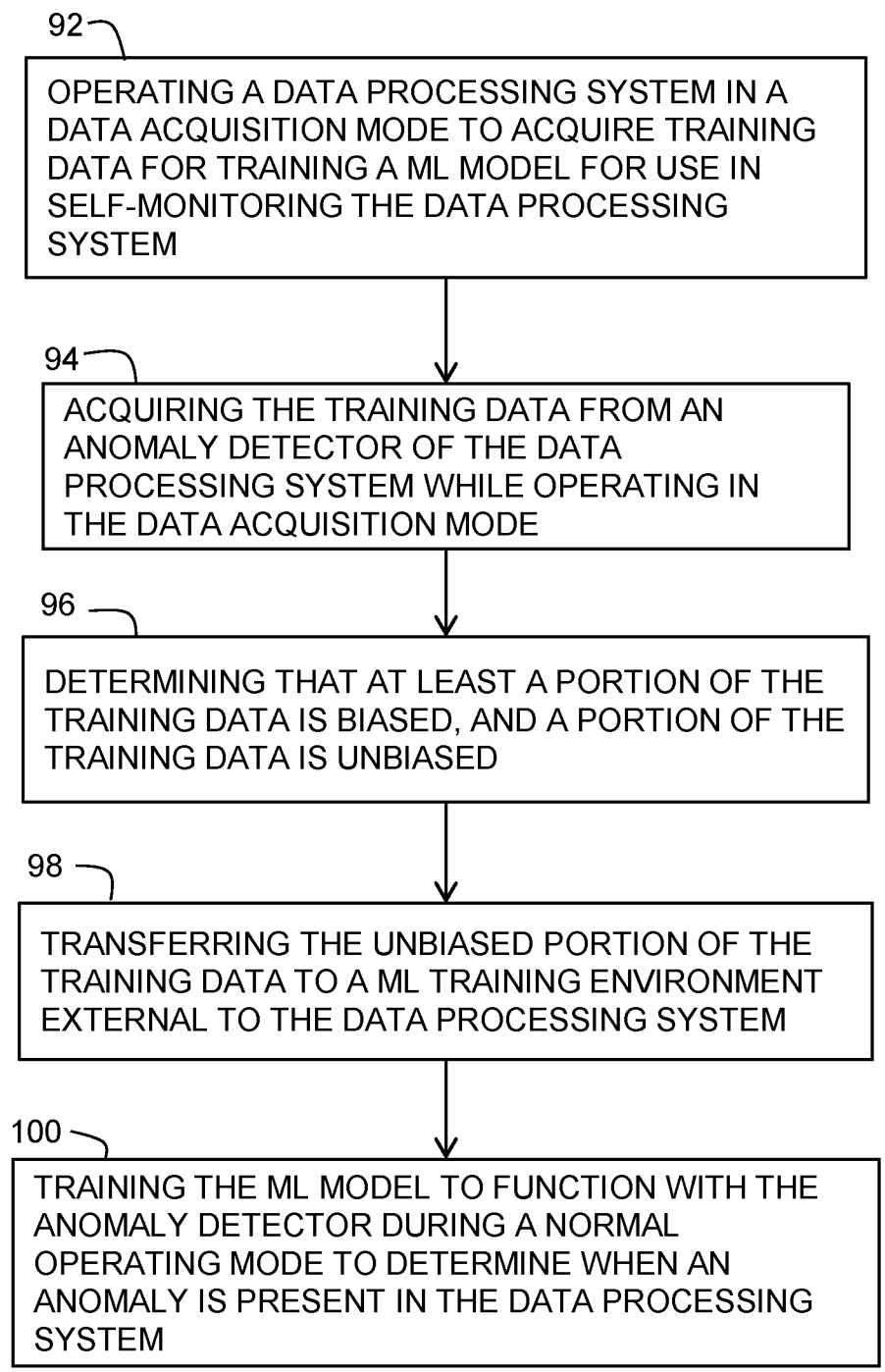
FIG. 7 illustrates a flow chart of a method for acquiring data for training a ML model in accordance with an embodiment.

FIG. 7 illustrates a flow chart of method 90 for acquiring data for training a ML model in accordance with an embodiment. Method 90 begins at step 92. At step 92, a data processing system is operated in a data acquisition mode to acquire training data for training a ML model for use in self-monitoring the data processing system. At step 94, training data is acquired from an anomaly detector of the data processing system while operating in the data acquisition mode. At step 96, at least a portion of the training data is determined to be biased, and a portion of the training data is determined to be unbiased. At step 98, the unbiased portion of the training data is transferred to a ML training environment external to the data processing system. At step 100, the ML model is trained to function with the anomaly detector during a normal operating mode to determine when an anomaly is present in the data processing system.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for acquiring data for training a machine learning (ML) model for use in self-monitoring a data processing system, the method comprising:
    operating the data processing system in a data acquisition mode to acquire training data for training the ML model;
    acquiring the training data from an anomaly detector of the data processing system while operating in the data acquisition mode;
    determining that at least a portion of the training data is biased, and a portion of the training data is unbiased; and
    transferring the unbiased portion of the training data to a training environment external to the data processing system, wherein the unbiased portion of the training data is acquired for training the ML model to function with the anomaly detector during a normal operating mode to determine when an anomaly is present in the data processing system,
    wherein determining that at least a portion of the training data is biased further comprises determining that the biased portion of the training data is biased when the training data is provided to the training environment concurrently with the acquisition of the training data from the anomaly detector.

2. The method of claim 1, wherein transferring the unbiased portion of the training data to a training environment further comprises using a dedicated interface to provide the unbiased portion of the training data to the training environment.

3. The method of claim 1, wherein acquiring the training data from the anomaly detector further comprises:
    providing a dummy function in the data processing system, the dummy function configured to always indicate to the data processing system that operation of the data processing system is a predetermined state when the training data is being acquired;
    storing the training data in a memory of the data processing system during a data acquisition period; and transferring the training data to the training environment during a data transfer period following the data acquisition period.

4. The method of claim 3, wherein the training data is transferred to the training environment using a general-purpose input/output (I/O) port of the data processing system.

5. The method of claim 3, wherein storing the training data in a memory of the data processing system during a data acquisition period further comprises storing the training data in a memory used to store at least a portion of the ML model during the normal operating mode.

6. The method of claim 3, wherein if a portion of the data transfer period overlaps with a portion of the data acquisition period, discarding the training data acquired during a time when the data transfer period overlaps with the data acquisition period.

7. The method of claim 1, wherein the unbiased training data is only acquired a predetermined amount of time after transferring the unbiased portion of the training data to the training environment is complete.

8. The method of claim 1, further comprising:
determining that an initial data acquisition after powering up the data processing system is not biased; and
determining that subsequent data acquisitions have a beginning portion that is biased, wherein the beginning portion of the subsequent data acquisition is discarded.

9. A data processing system comprising:
a processor for executing instructions;
a machine learning (ML) model;
an anomaly detector, the anomaly detector used for acquiring training data for training the ML model during a training data acquisition mode of the data processing system, wherein the anomaly detector and the ML model together determine when an anomaly is present in the data processing system during a normal operating mode;
a memory, coupled to the processor and to the anomaly detector, wherein the acquired training data is stored in the memory before being transferred to an ML model training environment; and
a data transfer interface for transferring the acquired training data to the training environment during a time when the training data is not being acquired using the anomaly detector,
wherein the data processing system further comprising:
determining that at least a portion of the training data is biased, and a portion of the training data is unbiased,
transferring the unbiased portion of the training data to a training environment external to the data processing system, wherein the unbiased portion of the training data is acquired for training the ML model to function with the anomaly detector during a normal operating mode,
wherein determining that at least a portion of the training data is biased further comprises determining that the biased portion of the training data is biased when the training data is provided to the training environment concurrently with the acquisition of the training data from the anomaly detector.

10. The data processing system of claim 9, wherein training data acquired during a period of time after a data transfer period is determined to be biased and is discarded.

11. The data processing system of claim 9, wherein the data transfer interface is characterized as being a general-purpose input/output port.

12. The data processing system of claim 9, wherein the memory is used for storing at least a portion of the ML model after the ML model is trained and being used for anomaly detection during the normal operating mode.

13. The data processing system of claim 9, further comprising a dummy function stored in the memory, the dummy function configured to always indicate to the data processing system that the operation of the data processing system is normal when the training data is being acquired.

14. The data processing system of claim 9, wherein the data processing system is implemented using one or more integrated circuits.

15. The data processing system of claim 9, further comprising determining that an initial data acquisition after powering up the data processing system is not biased.

16. A method for acquiring data for training a machine learning (ML) model for use in self-monitoring a data processing system, the method comprising:
operating the data processing system in a data acquisition mode to acquire training data for training the ML model;
acquiring the training data from an anomaly detector of the data processing system while operating in the data acquisition mode;
providing a dummy function in the data processing system, the dummy function configured to always indicate to the data processing system that operation of the data processing system is normal when the training data is being acquired;
storing the training data in a memory of the data processing system during a data acquisition period;
transferring the training data to the training environment during a data transfer period following the data acquisition period;
determining that at least a portion of the training data is biased, and a portion of the training data is unbiased; and
transferring the unbiased portion of the training data to a training environment external to the data processing system, wherein the unbiased portion of the training data is acquired for training the ML model to function with the anomaly detector during a normal operating mode to determine when an anomaly is present in the data processing system,
wherein determining that at least a portion of the training data is biased further comprises determining that the biased portion of the training data is biased when the training data is provided to the training environment concurrently with the acquisition of the training data from the anomaly detector.

17. The method of claim 16, wherein determining that at least a portion of the training data is biased, and a portion of the training data is unbiased, further comprises determining that a portion of the training data acquired during a data acquisition period that immediately follows a data transfer period is biased and is discarded.

18. The method of claim 16, wherein transferring the training data to the training environment during a data transfer period following the data acquisition period further comprises transferring the data using a general-purpose input/output (I/O) port of the data processing system.

19. The method of claim 16, wherein the anomaly detector is for detecting an unauthorized access to the data processing system.

* * * * *